United States Patent [19]

Hara et al.

[11] Patent Number: 4,678,910
[45] Date of Patent: Jul. 7, 1987

[54] REFERENCE POSITION-DETECTING DEVICE FOR PHOTOELECTRIC ENCODER

[75] Inventors: Masato Hara; Atsumi Kaneko, both of Tokyo, Japan

[73] Assignee: Asahi Optical Co., Ltd., Tokyo, Japan

[21] Appl. No.: 709,590

[22] Filed: Mar. 8, 1985

[30] Foreign Application Priority Data

Apr. 27, 1984 [JP] Japan ................................. 59-87434

[51] Int. Cl.⁴ ............................................. G01D 5/34
[52] U.S. Cl. ......................... 250/237 G; 250/231 SE; 340/347 P
[58] Field of Search ..................... 250/231 SE, 237 G; 356/395; 340/347 P, 870.29

[56] References Cited

U.S. PATENT DOCUMENTS

| | | | |
|---|---|---|---|
| 4,123,750 | 10/1978 | Leney et al. | 340/347 P |
| 4,143,364 | 3/1979 | Dlugos | 340/347 P |
| 4,240,069 | 12/1980 | Hullein et al. | 250/231 SE |
| 4,266,215 | 5/1981 | Adams | 340/347 P |
| 4,443,787 | 4/1984 | Denk et al. | 250/231 SE |
| 4,451,731 | 5/1984 | Leonard | 250/237 G |
| 4,477,189 | 10/1984 | Ernst | 250/237 G |
| 4,580,047 | 4/1986 | Sasaki et al. | 250/237 G |

Primary Examiner—Edward P. Westin
Assistant Examiner—Charles Wieland
Attorney, Agent, or Firm—Amster, Rothstein & Ebenstein

[57] ABSTRACT

A reference position-detecting device for use with a photoelectric, incremental encoder which produces a sinusoidal signal in response to the movement of an index scale relative to a main scale. A pattern comprising bright portions and dark portions alternately arranged is formed on the main scale. A similar pattern is formed on the index scale. The device comprises a random pattern formed at some location of the main scale, a similar random pattern formed at some location of the index scale, optical devices for producing a signal indicative of a reference position, a first pulse generator for producing pulses in response to the signal above, second and third pulse generators for producing two kinds of pulses that are 90° out-of-phase in response to the sinusoidal signal, a direction detector for detecting the direction of the movement of the index scale, an analog switch having non-inverting and inverting inputs, a counter for counting the count pulses from the switch, and a fourth pulse generator for resetting the counter on the leading or trailing edge of each count pulse during the presence of the pulses indicating the reference position.

3 Claims, 5 Drawing Figures 4,678,910

REFERENCE POSITION-DETECTING DEVICE FOR PHOTOELECTRIC ENCODER

FIELD OF THE INVENTION

The present invention relates to a device which is used with a photoelectric, incremental encoder to detect a reference position and, more particularly, to improvements in a device which detects a reference position on a main scale by making use of signals obtained from an optically detected lattice formed on the main scale as well as from an optically detected lattice formed on an index scale that moves relative to the main scale.

BACKGROUND OF THE INVENTION

Heretofore, photoelectric encoders have used a reference position-detecting device in which an identical random pattern is formed on both a main scale and an index scale. The alignment of one pattern with the other is sensed by an optical means, and the resulting electrical signal is used to indicate a reference position. Since the electrical signal produced in this way takes the form of pulses having a given duration, the reference position is represented by the given pulse duration. Hence, it has not been possible to accurately determine positions.

The above problem is now discussed by referring to FIG. 5. When a signal 101 obtained by sensing a reference position is converted into a pulse 103 using a constant-level signal 102, the pulse 103 has a duration of T. To shorten this duration T, the level of the signal 102 may be increased. However, if the signal 102 is elevated to a too large level, the pulse 103 may not be produced correctly because of variations of the signal 101 which are caused by changes in the light quantity or generation of noise. Thus, the signal 102 is set to a certain level which is not affected by variations of the signal 101. Consequently, the pulse 103 is basically given the pulse duration T. When the index scale is moved to the right relative to the main scale, a signal 104 which indicates the reference position is obtained. When the index scale is shifted to the left relative to the main scale, a signal 105 indicative of the reference position is derived. These signals 104 and 105 involve a time error which depends on the direction and corresponds to the pulse duration T.

If this pulse duration T is within the pulse separation between the successive pulses (referred to as "count pulses" herein) which are derived from a sinusoidal signal generated by the relative movement between the main and index scales, then the count pulse produced during the duration of the pulse 103 is only one. Accordingly, no practical problems will occur whether the index scale moves to the left or to the right. However, when an additional pulse is interpolated between two successive count pulses to increase the response rate of each processing circuit or to enhance the resolution of the encoder, the allowable range for the pulse duration T is quite narrow. Therefore, in case where the optically detected lattices for detection of a reference position have not been machined accurately, it is not expected that the reference position is detected accurately.

SUMMARY OF THE INVENTION

The present invention has been devised in view of the foregoing problems with the prior art technique.

It is the main object of the present invention to provide a device which can detect a reference position accurately without producing error that depends on direction, repetitive error, or other error and which enhances the resolution of a photoelectric encoder with which the device is used.

This object is achieved by a device where a signal which is produced by sensing a reference position and which has a certain pulse duration is positively employed to detect the leading or trailing edge of the count pulse that corresponds to the reference position during one pulse duration, the resultant signal being used to indicate the reference position.

The above and other objects as well as the features of the invention will become more readily apparent from the ensuing specification and claims when taken with the drawings.

DETAILED DESCRIPTION OF THE INVENTION

Figure 1:
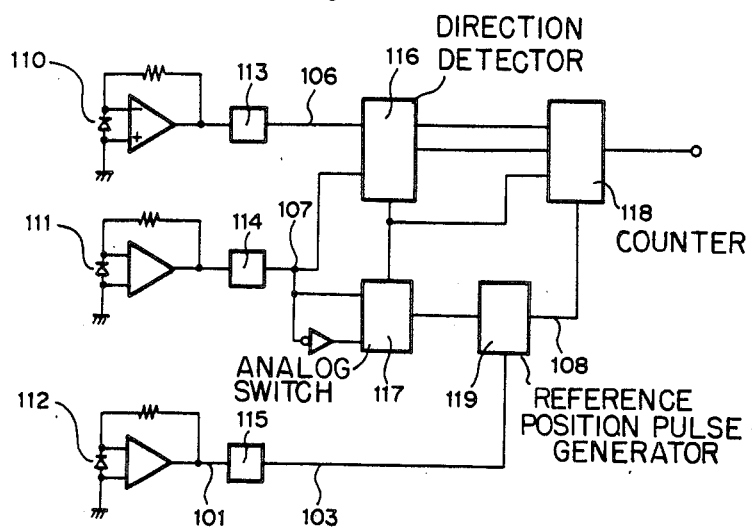
FIG. 1 is a circuit diagram of a device according to the present invention.

Referring to FIG. 1, there is shown a device embodying the concept of the present invention. This device includes light-receiving devices 110, 111, 112 for receiving light from a light-emitting devices (not shown) such as light-emitting diodes through patterns as shown in FIG. 3. Pulse generator circuits 113, 114, and 115 are connected to the outputs of the light-receiving devices 110 111 and 112 respectively. The generator circuits 113 and 114 produce count pulses 106 and 107, respectively. The generator circuit 115 delivers pulses 103 for detection of a reference position. The count pulses 106 and 107 which are generated by the circuits 113 and 114 are 90° out-of-phase, and are applied to a direction detector 116 for detecting the direction of the movement of index scale 121 relative to a main scale 120, both scales being shown in FIG. 3. The count pulses 107 are also applied to an analog switch 117, which also receives the inversion of the pulses 107. The outputs of the direction detector 116 are connected to the analog switch 117 and to a counter 118. The output from the direction detector 116 causes the switch 117 to deliver the count pulses 107 without inverting them when the index scale 121 moves to the right relative to the main scale 120 and to deliver the inversion of the pulses 107 when the index scale 121 moves to the left. A pulse generator 119 receives the output from the analog switch 117 and the pulses 103, which are delivered by the pulse generator circuit 115 and used for detection of a reference position. Only when the pulses 103 are present, the generator 119 delivers a signal 108 indicative of a reference position to the counter 118 on the leading edge of each count pulse 107. Thus, it follows that the signal 108 indicative of a reference position is produced only at points indicated by the small triangles in FIG. 2. Consequently, no error depending on direction results whether the index scale 121 moves to the left or to the right relative to the main scale 120. The signal 108 is used to reset the counter 118.

Figure 2:
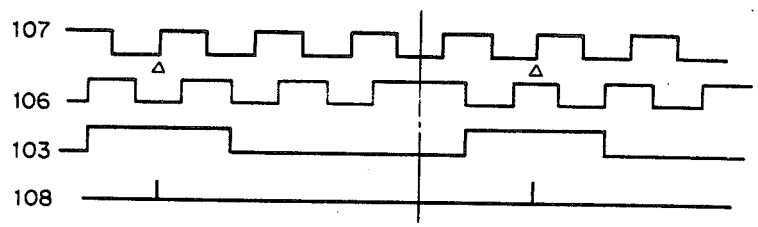
FIG. 2 is a waveform diagram of the outputs from main portions of the circuit shown in FIG. 1, and in which the portion lying to the left of the dot-and-dash line represents the waveforms obtained when an index scale moves to the right relative to a main scale and the portion lying to the right if the line represents the waveforms obtained when the index scale moves to the left.
Figure 3:
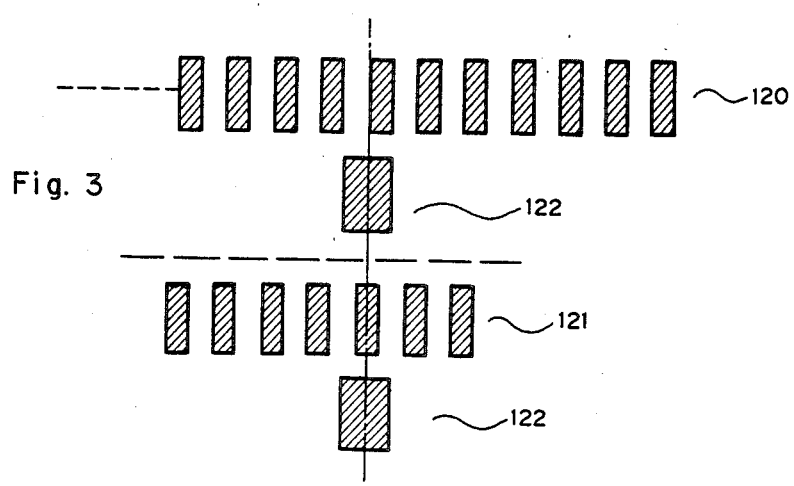
FIG. 3 is a schematic diagram showing the arrangement of the main scale and the index scale and their respective, optically detected lattices for detection of a reference position, the scales and the lattices producing the waveforms shown in FIG. 2.

The relations between the waveforms as shown in FIG. 2 are obtained by placing optically detected lattices 122 for detection of a reference position such that one side of one bright portion (indicated by hatching) of the main scale 120 registers with the center of the bright portion of one lattice 122 and that the center of one bright portion of the index scale 121 registers with the center of the bright portion of the other lattice 122, as shown in FIG. 3.

Figure 4:
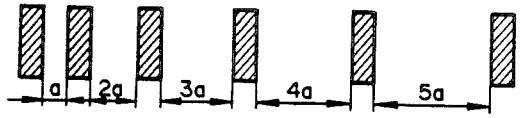
FIG. 4 is a diagram of one example of index scale pattern.
Figure 5:
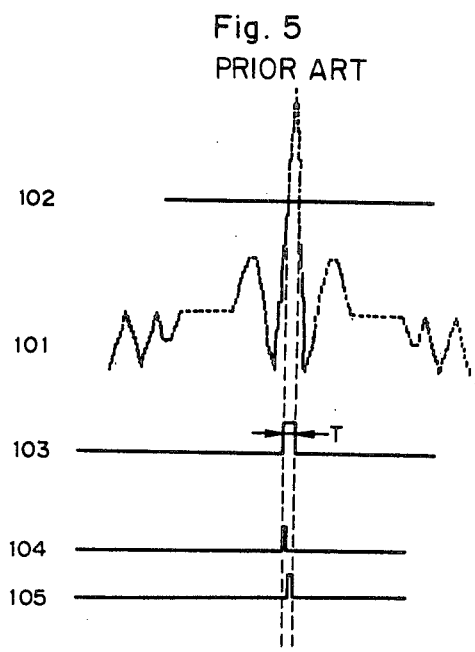
FIG. 5 is a waveform diagram of the outputs obtained from main portions of a conventional device for detecting a reference position.

Referring back to FIG. 5, special random patterns have been heretofore formed on the main and index scales to obtain the signal 101 indicative of a reference point. In contrast, the device according to the invention makes use of the main scale 120 that has the bright portions arranged as shown in FIG. 3. If the pattern is so formed that the distance between the successive dark portions is increased in an arithmetic progression as shown in FIG. 4, then it is easy to obtain the signal 101 whose largest value is at least three times as large as the second largest value. Since the largest value is considerably larger than the other larger values, the range of the constant-level signal 102 is made broad, whereby the signal indicating a reference position is not susceptible to noise.

As thus far described, a signal indicating a reference position is shaped into a pulse form having a certain duration, but another signal indicative of the reference position can be generated at one point during the pulse duration in accordance with the invention. This does not introduce error depending on direction, repetitive error, or other error. Further, no special random patterns are required on the scales, but rather only a simple pattern suffices to obtain a signal which indicates a reference position and the largest value of which makes a large difference with the second largest value. As such, an accurate reference positiondetecting device can be fabricated which is insusceptible to noise.

What is claimed is:

1. A reference position-detecting device for use with a photoelectric, incremetal encoder including a main scale having a first pattern of open and closed regions alternately arranged at regular intervals with the regions having the same widths; an index scale having a second pattern of open and closed regions; first light emitting and receiving means for producing a sinusoidal signal from said first and second patterns when said scales move relative to each other; said reference positon-detecting device comprising:
    a first random pattern of open and closed regions on said main scale and associated with said first regular pattern;
    a second random pattern of open and closed regions on said index scale similar to said first random pattern and associated with said second regular pattern;
    second light emitting and receiving means for producing a first electric signal when said random patterns are generally in a reference position;
    first pulse generating means responsive to said first electrical signal for producing a first pulse electrical signal;
    second pulse generating means responsive to said sinusoidal signal for producing a second pulse electrical signal having leading and trailing edges;
    third pulse generating means responsive to said sinusoidal signal for producing a third pulse electrical signal having leading and trailign edges, said second and third pulse electrical signals being 90° out of phase with each other;
    direction detection means coupled to said second and third pulse electrical signals for determining the direction of movement of said main and index scales relative to each other and for producing an output signal; and
    fourth pulse generating means responsive to said first, second and third pulse electrical signals and said direction detecting means for producing a fourth pulse electrical signal corresponding to an edge of said second and third pulse electrical signals when said first pulse electrical signal is present, thereby indicating that said main and index scales are substantially in said reference position.

2. The reference position-detecting device of claim 1, wherein said first and second random patterns each have closed regions which increase in an arithmetic progression.

3. The reference position-detecting device of claim 1, further comprising a counter coupled to the output signal of said direction detecting means and responsive to said fourth pulse electrical signal.

* * * * *